(12) United States Patent
Lan et al.

(10) Patent No.: US 7,546,892 B2
(45) Date of Patent: Jun. 16, 2009

(54) COOLING STRUCTURE FOR A CONTINUOUS VARIATION TRANSMISSION SYSTEM OF AN ALL-TERRAIN VEHICLE

(75) Inventors: Jzu-Jung Lan, Kaohsiung (TW); Chao-Chang Ho, Kaohsiung (TW); Wen-Ming Su, Kaohsiung (TW)

(73) Assignee: Kwang Yang Motor Co., Ltd., Kaohsiung (TW)

( * ) Notice: Subject to any disclaimer, the term of this patent is extended or adjusted under 35 U.S.C. 154(b) by 0 days.

(21) Appl. No.: 12/164,131

(22) Filed: Jun. 30, 2008

(65) Prior Publication Data

US 2008/0264707 A1 Oct. 30, 2008

Related U.S. Application Data

(62) Division of application No. 11/376,230, filed on Mar. 16, 2006.

(51) Int. Cl.
 *B60K 11/00* (2006.01)
 *B60K 13/02* (2006.01)
(52) U.S. Cl. .................. 180/68.2; 180/68.1; 180/68.3
(58) Field of Classification Search ................ 180/68.1, 180/68.2, 68.3
 See application file for complete search history.

(56) References Cited

U.S. PATENT DOCUMENTS

| | | | | |
|---|---|---|---|---|
| 4,697,665 A * | 10/1987 | Eastman et al. | ............. | 180/230 |
| 5,086,858 A * | 2/1992 | Mizuta et al. | ............. | 180/68.3 |
| 6,695,083 B2 * | 2/2004 | Nakamura et al. | ......... | 180/68.1 |
| 6,705,417 B2 * | 3/2004 | Kitai et al. | ................ | 180/68.1 |
| 6,820,708 B2 * | 11/2004 | Nakamura | ................ | 180/68.2 |
| 6,823,956 B2 * | 11/2004 | Shimizu | .................. | 180/68.1 |
| 6,938,676 B2 * | 9/2005 | Lan et al. | ..................... | 165/41 |
| 7,059,438 B1 * | 6/2006 | Sheets | ....................... | 180/68.1 |
| 2002/0134598 A1 * | 9/2002 | Nakamura et al. | ......... | 180/68.1 |
| 2003/0066696 A1 * | 4/2003 | Nakamura | ................. | 180/68.1 |

* cited by examiner

*Primary Examiner*—Glenn Dayoan
*Assistant Examiner*—John R Olszewski
(74) *Attorney, Agent, or Firm*—Leong C. Lei

(57) ABSTRACT

A cooling structure for a continuous variation transmission system of an all-terrain vehicle which includes a radiator mounted at a front end of the vehicle and under a front body cover, a hood enclosing the radiator, a gearbox having an inlet and an outlet, the inlet being connected with an inlet conduit for drawing outside cool air into the gearbox, the outlet being connected with an exhaust conduit for discharging hot air from the gearbox, wherein the inlet conduit has an inlet end mounted between the hood and the front body cover and shielded by the hood and the front body cover, whereby the cooling structure can effectively prevent water, dirt and dust from entering the gearbox and are simple in construction and easy to assemble and maintain.

5 Claims, 8 Drawing Sheets

US 7,546,892 B2

COOLING STRUCTURE FOR A CONTINUOUS VARIATION TRANSMISSION SYSTEM OF AN ALL-TERRAIN VEHICLE

CROSS-REFERENCE

This is a division of the co-pending patent application Ser. No. 11/376,230 filed on Mar. 16, 2006.

BACKGROUND OF THE INVENTION

1. Field of the Invention

This invention is related to a cooling structure for a continuous variation transmission system of an all terrain vehicle and in particular to one which can prevent water, dirt and dust from entering the gearbox and enables ease of assembly and maintenance, and also reduces the difficulty in installing other components.

2. Description of the Prior Art

Referring to FIG. 1, in general, all-terrain vehicles 1 are mainly composed of a chassis II, a steering mechanism 12, front wheels 13, a riding seat 14, rear wheels 15, an engine 16 and the continuous variation transmission system 2. A steering mechanism 12 is installed in front of the chassis 11, with a set of front wheels 13 beneath the steering mechanism 12. There is a riding seat 14 on top of the chassis 11, and below the riding seat 14 is the engine 16. The engine 16 drives the continuous variation transmission system 2 by means of the crankshaft, and a set of rear wheels 15 is attached to the continuous variation transmission system 2.

When the all-terrain vehicle 1 is activated, fresh air is introduced from outside and mixed with fuel to form a fuel/air mixture. The oil vapor is then delivered into the engine 16 to initiate power to advance the piston into high-speed reciprocating motion. An interactive crankshaft drives the pulley mechanism and initiates turning of the rear wheels 15, which will lead in the concurrent turning of the front wheels 13 and achieve the purpose of movement.

Referring to FIG. 2, the continuous variation transmission system 2 in the all-terrain vehicle 1 consists of a pulley mechanism 21 placed inside a gearbox 22. The pulley mechanism 21 is composed of a sliding disc 211 placed above a crankshaft 161, a driving plate 212 placed above the crankshaft 161 and to one side of the sliding disc 211, a bracket 213 placed above the crankshaft 161, and to the other side of the sliding disc 211, a counter weight 214 placed amid the sliding disc 211 and the bracket 213 due to the limitation of space, a follower shaft 215 which transmits the power to the rear wheels, a follower disc 216 placed on top of the follower shaft 215, a clutch 217 fixed on top of the follower shaft 215, and a transmission belt 218. The sliding disc 211 and the driving plate 212 constitutes an initiating member of the pulley mechanism 21. One end of said transmission belt 218 is placed in between the driving disc 212 and said sliding disc 211, and the other end is placed amid the follower disc 216. The gearbox 22 has an air inlet 221 and an air exhaust 222 with an inlet conduit 223 attached to the air inlet 221 and an exhaust conduit 224 attached to the air exhaust 222.

Inside the combustion chamber of the vehicle engine 16, the power initiated from combustion explosion will advance the piston into a high-speed reciprocating motion, and consequently initiate the spinning of the crankshaft 161. The sliding disc 211 and the driving disc 212 will spin concurrently and in consequence speed up the spinning of the follower disc 216. Via the clutch 217, the follower shaft 215 will be driven to speed up the spinning and increase the advancing speed of the vehicle. By this time, the high heat produced from spinning of pulley mechanism 21 has to be cooled down by introducing outside cool air from the air inlet conduit 223, and passing through the air inlet 221 to enter the gearbox 22. The hot air will then pass through the exhaust conduit 224 from the air exhaust 222 and exhaust to the outside, to prevent the pulley mechanism 21 from being damaged by overheating.

All terrain vehicles are designed for off-road use, which can support many off-road tasks within seaside, s popular for recreational use such as for use in traveling at seaside, mountains or wild lands. However, the manufacturer must concern about how to prevent sand, dirt and water from entering the gearbox 22 through the air inlet 223 or the air exhaust 224 to cause damage to the belt variation transmission 21. The conventional all terrain vehicle 1 uses an air inlet box 2231 on the air inlet 223 and an air exhaust box 2241 on the air exhaust 224 to obviate the drawbacks. As shown in FIG. 3, the air inlet box 2231 and the air exhaust box 2241 are fastened at an appropriate height under the cover so as to prevent sand, dirt and water from entering the gearbox 22.

Nevertheless, although the conventional cooling device of the terrain vehicle can prevent sand, dirt and water from entering the gearbox 22, it is complicated in structure and difficult to assemble and maintain and needs improvement.

SUMMARY OF THE INVENTION

This invention is related to an improvement in the cooling structure for a continuous variation transmission system of an all terrain vehicle.

It is the primary object of the present invention to provide an improved cooling structure for a continuous variation transmission system of an all-terrain vehicle which includes a radiator mounted at a front end of the vehicle and under a front body cover, a hood enclosing the radiator, a gearbox having an inlet and an outlet, the inlet being connected with an inlet conduit for drawing outside cool air into the gearbox, the outlet being connected with an exhaust conduit for discharging hot air from the gearbox, wherein the inlet conduit has an inlet end mounted between the hood and the front body cover and shielded by the hood and the front body cover, the inlet end of the inlet conduit is mounted in front of a heat dissipating end of the radiator and positioned closer to a head of the vehicle than the heat dissipating end of the radiator, whereby the invention can effectively prevent water, dirt and dust from entering the gearbox and enables ease of assembly and maintenance, and also reduces the difficulty in installing other components.

It is another object of the present invention to provide an improved cooling structure for a continuous variation transmission system of an all-terrain vehicle which includes a continuous transmission system, and a gearbox enclosing the continuous transmission system and having a front end provided with an inlet and a rear end provided with an outlet, the inlet being connected with an inlet conduit for drawing outside cool air into the gearbox, the outlet being connected with an exhaust conduit for discharging hot air from the gearbox, wherein a cap is provided on a bottom side of a rear body cover and receives an outlet end of the exhaust conduit for preventing water, dirt and dust from entering the exhaust conduit, the cap has an opened end facing a rear portion of the vehicle, the outlet end of the exhaust conduit is mounted facing a head portion of the vehicle, and a lateral side of the cap and an outlet end of the exhaust conduit overlap in projection, whereby the invention can effectively prevent water, dirt and dust from entering the gearbox and enables ease of assembly and maintenance, and also reduces the difficulty in installing other components.

The foregoing objects and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENT

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
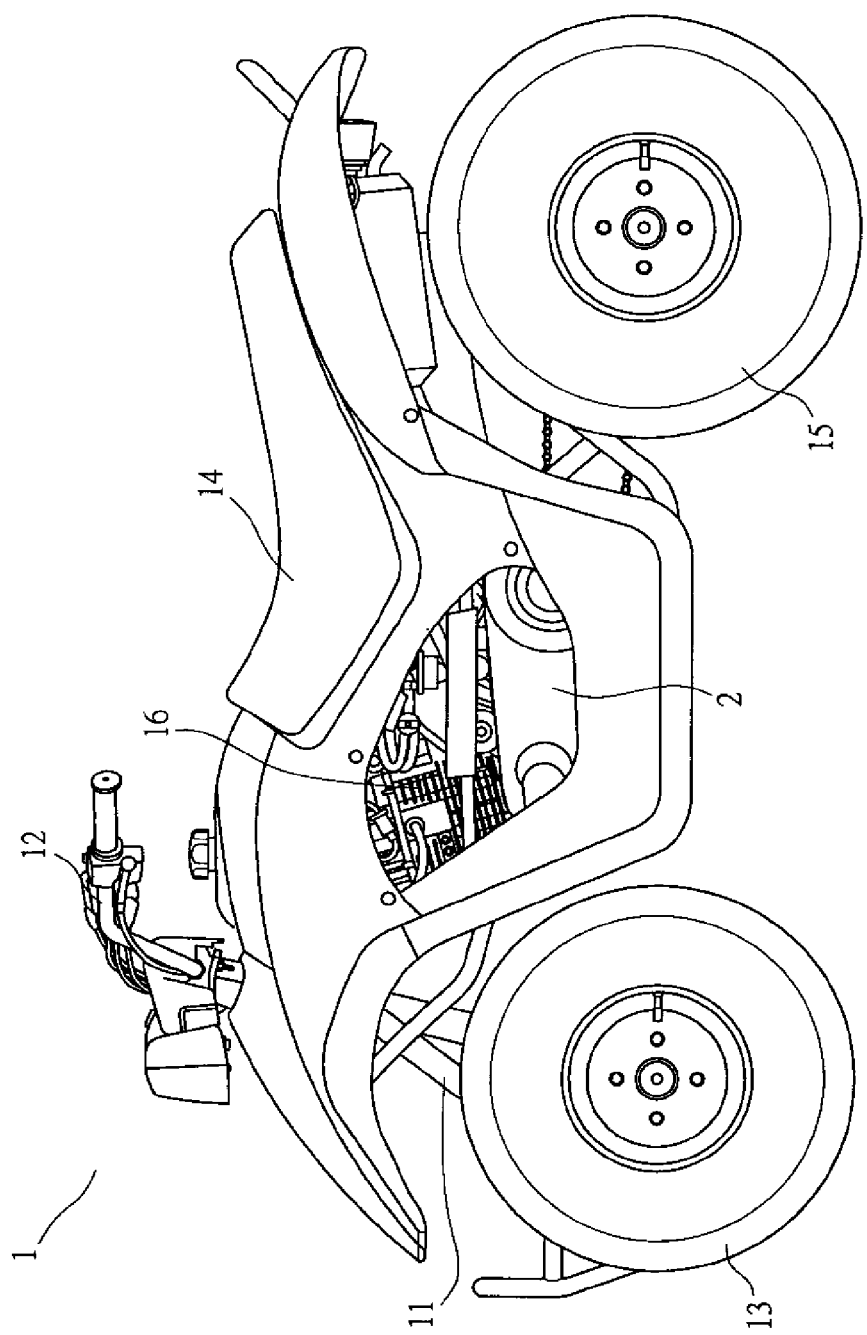
FIG. 1 is a side view of a prior art all terrain vehicle.
Figure 2:
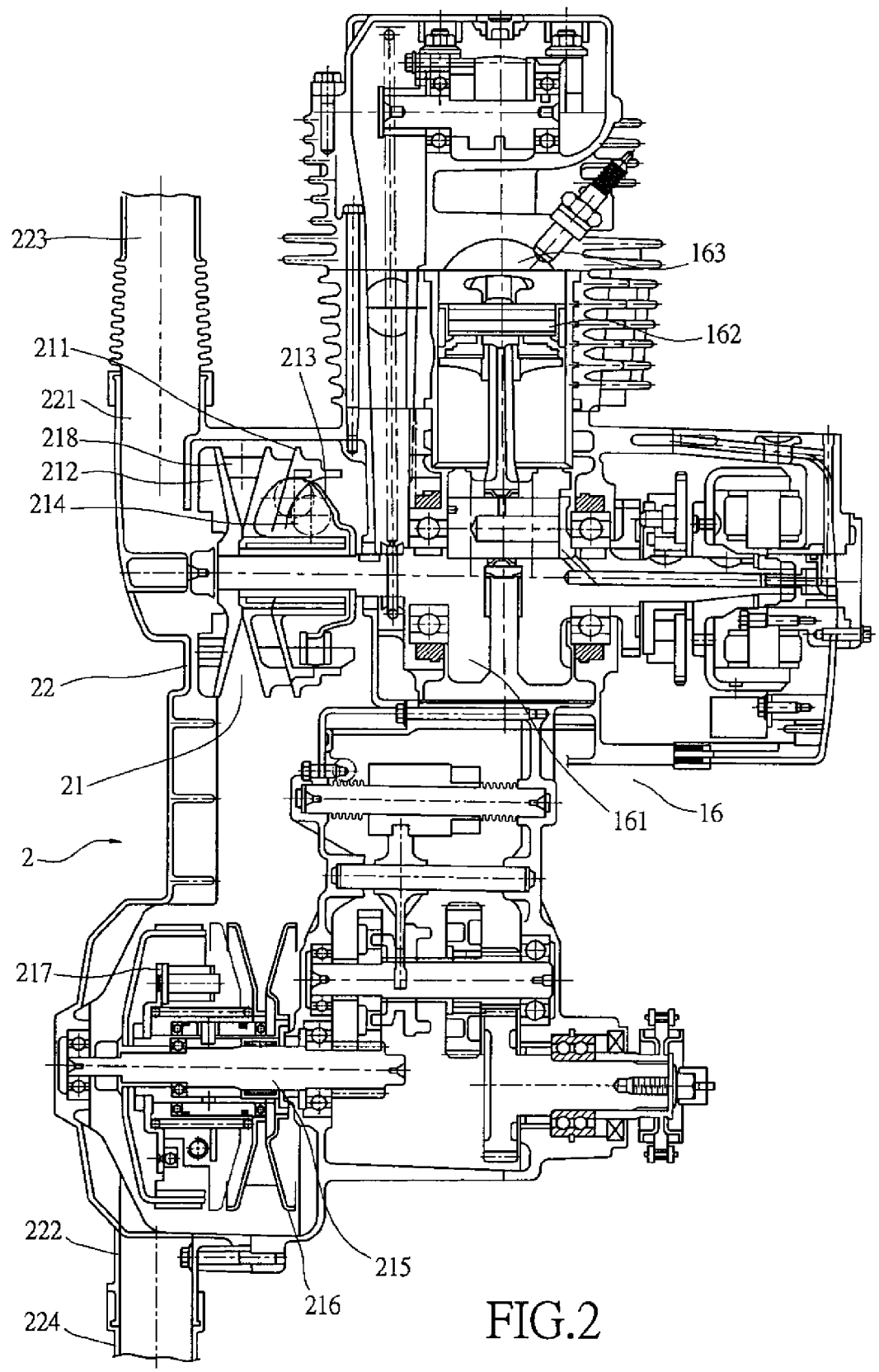
FIG. 2 is a sectional view of a prior art transmission mechanism for all terrain vehicles.
Figure 3:
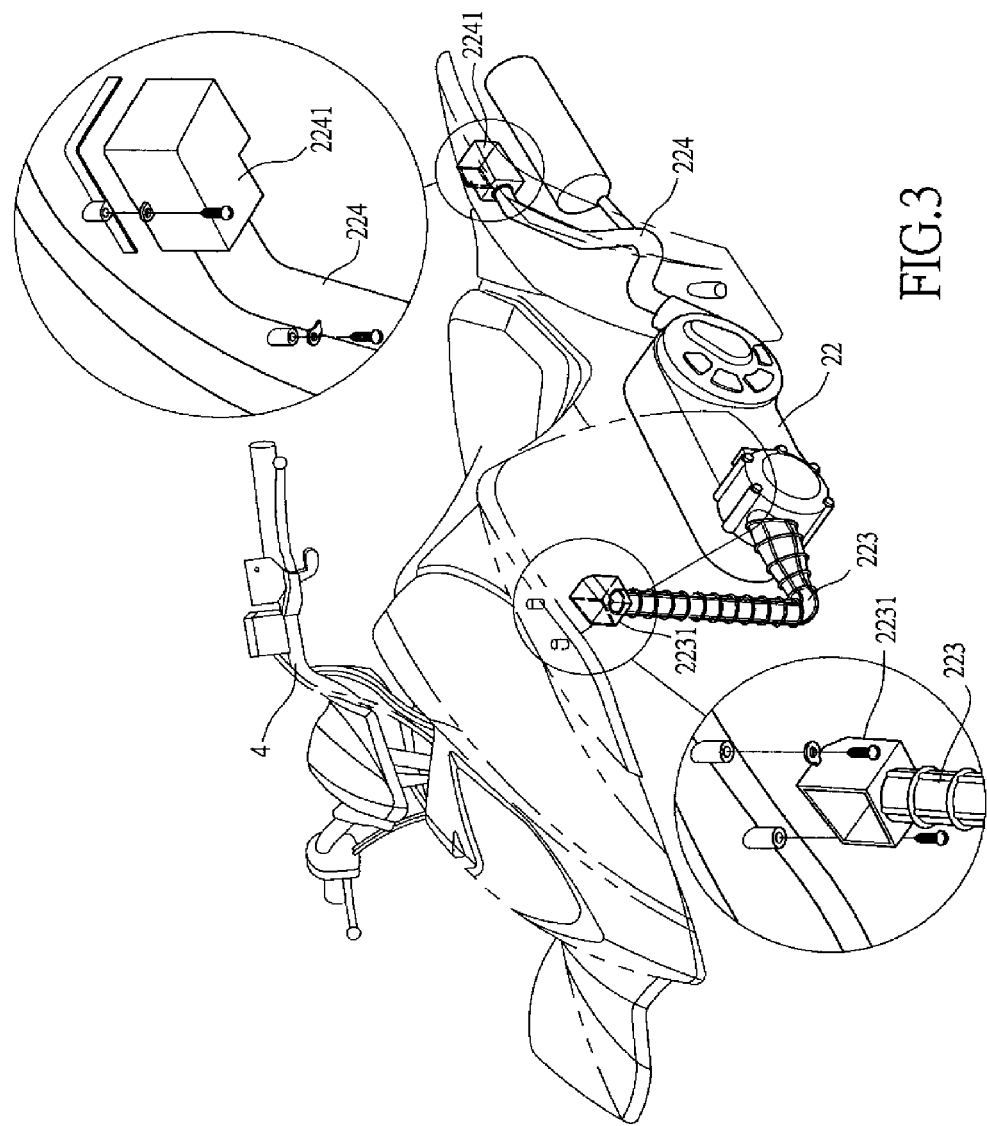
FIG. 3 illustrates a prior art cooling structure for all terrain vehicles.
Figure 4:
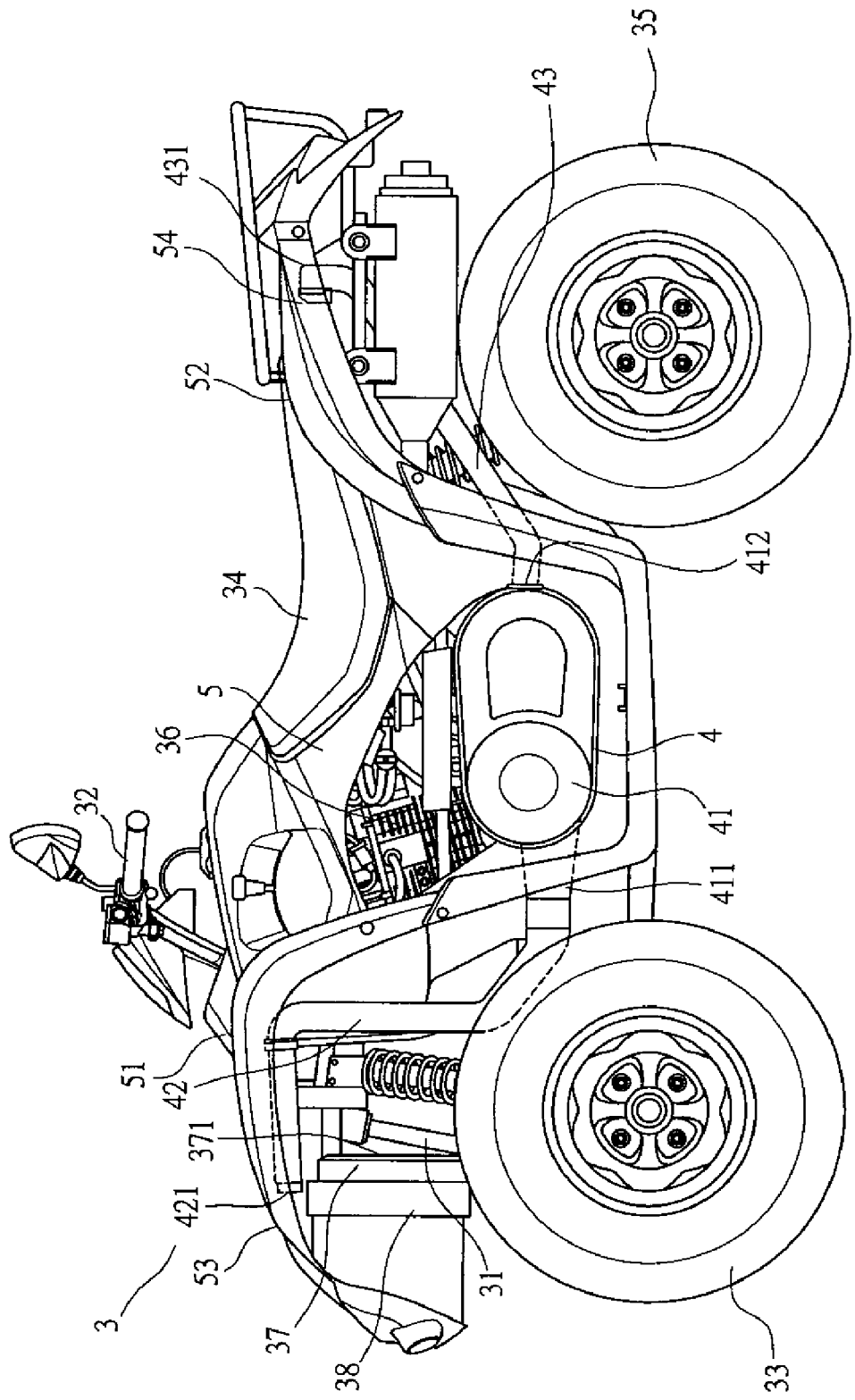
FIG. 4 is a side view of an all terrain vehicle according to the present invention.

Referring to FIG. 4, the all terrain vehicle 3 according to the present invention comprises a chassis 31, a steering mechanism 32, front wheels 33, a riding seat 34, rear wheels 35, an engine 36, a radiator 37 for cooling the engine 36, a hood 38 enclosing the radiator 37, and a transmission system 4.

A body cover 5 is mounted on the chassis 31 and comprises a front body cover 51 and a rear body cover 52 from which extend a front mudguard 53 and a rear mudguard 54, respectively. The front wheels 33 are arranged under the steering mechanism 32. On the chassis 31 is installed the riding seat 34 under which is mounted the engine 36. The engine 3 drives the transmission system 4 by means of a crankshaft. The transmission system 4 is enclosed within a gearbox 41. The rear wheels 35 are mounted behind the transmission system 4.

The radiator 37 is positioned under the front body cover 51 and mounted at the front most end of the vehicle. The outer side of the radiator 37 is enclosed within a hood 38, so that when the all terrain vehicle 3 travels, outside cool air will be guided into the radiator 37 through the hood 38 thereby dissipating the heat evolved from the radiator 37 to the heat dissipating end 371 of the radiator 37 and therefore releasing heat to the rear of the vehicle. Accordingly, the cooling fluid in the radiator 37 is cooled and flows into the engine 36 to cool it down thereby enabling the engine to operate at a high speed and for a long period of time.

As shown in FIG. 4, the front end of the gearbox 41 of the transmission system 4 has an air inlet 411 which is connected to an inlet conduit 42 which extends towards the head of the vehicle under the front body cover 51, so that the inlet end 421 of the inlet conduit 42 is arranged between the hood 38 and the front body cover 51. The inlet end 421 of the inlet conduit 42 is closer to the head of the vehicle than the heat dissipating end 371 of the radiator 37, thereby preventing the hot air dissipated from the radiator 37 from entering the inlet conduit 42. The gearbox 41 has an outlet 412 which is connected to an exhaust conduit 43, so that the outside cool air can flow through the gearbox 41 via the inlet conduit 42 to cool the transmission system 4 and then out of the exhaust pipe 43.

Figure 5:
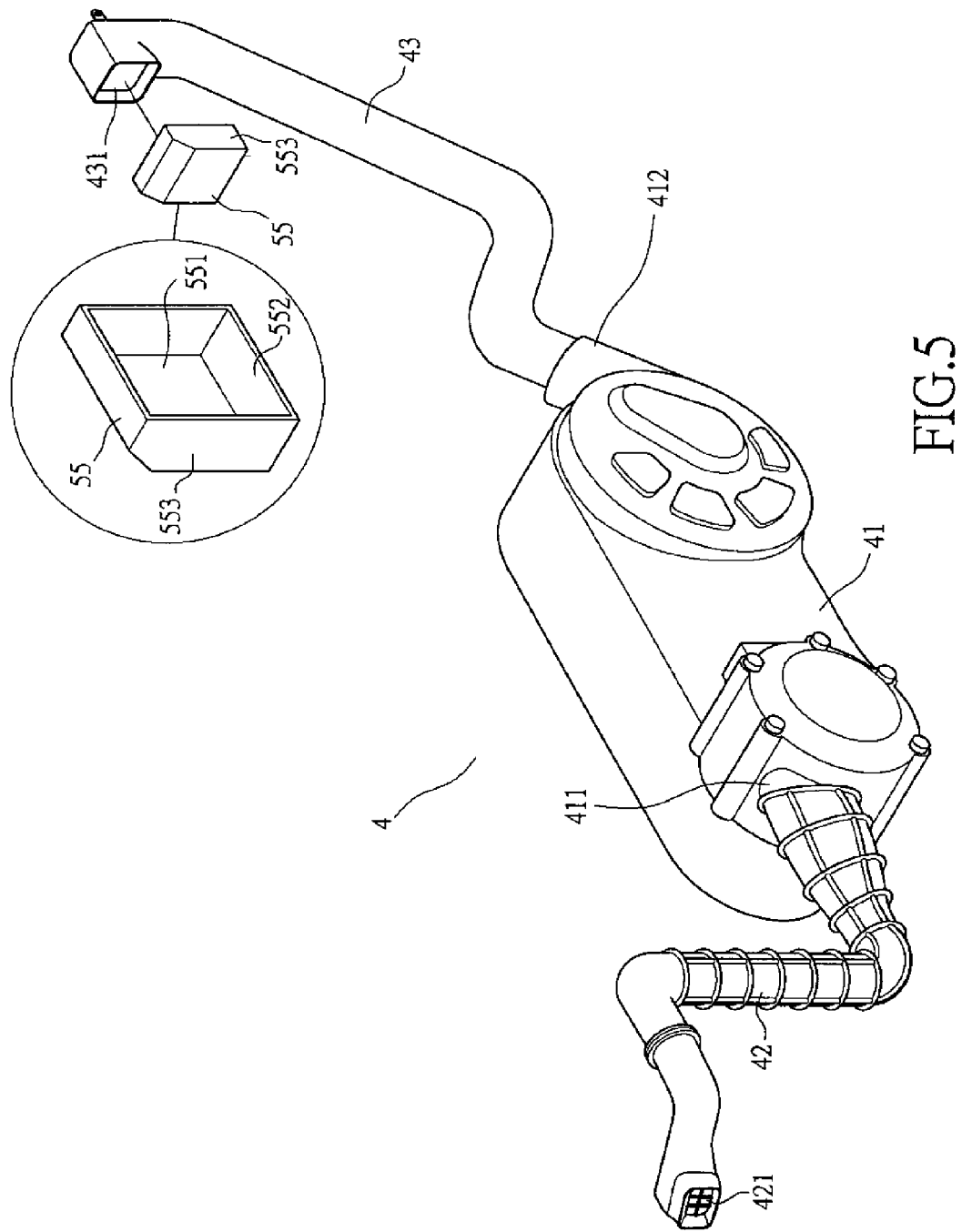
FIG. 5 illustrates a transmission mechanism for all terrain vehicles according to the present invention.
Figure 6:
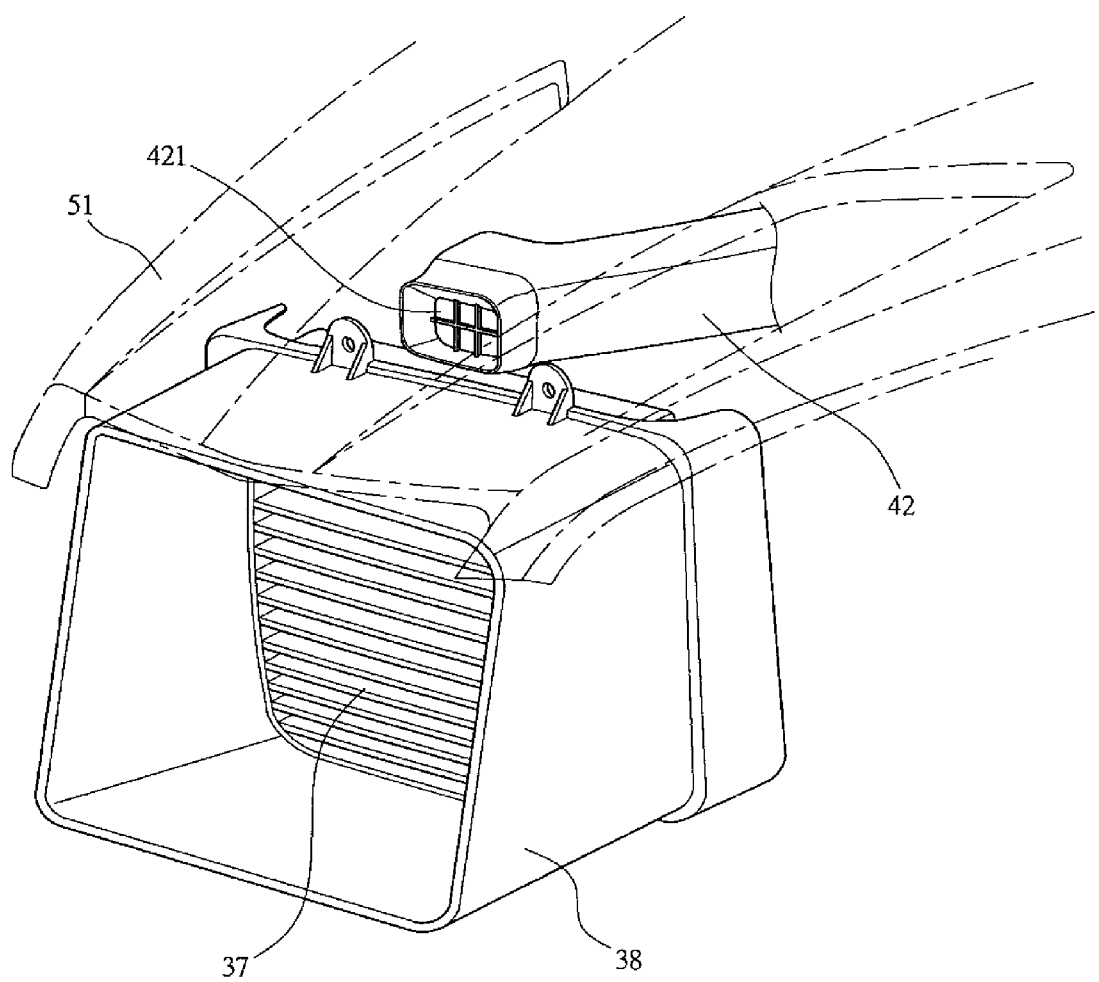
FIG. 6 illustrates how the gearbox is connected with an inlet conduit and an exhaust conduit according to the present invention.

Referring to FIGS. 5 and 6, the inlet conduit 42 has an inlet end 421 arranged between the hood 38 of the radiator 37 and the front body cover 51. The front part of the front body cover 51 has a recessed portion in contact with the top of the hood 8 thereby providing a shielding room for accommodating the inlet end 421 of the inlet conduit 42. Hence, water, dirt or dust can be prevented from entering the inlet end 421 of the inlet conduit 42. However, the outside cool air can flow through the passages formed between the hood 38 and the front body cover 51 and at two sides of the connection between the front body cover 51 and the top of the hood 8 into the inlet conduit 42. The hood 8 and the radiator 37 are mounted at the front end along the center line of the all terrain vehicle, where water, dirt and dust are less than other those in other portions, thereby further enhancing the effect of preventing water, dirt and dust from entering the gearbox 41.

Figure 7:
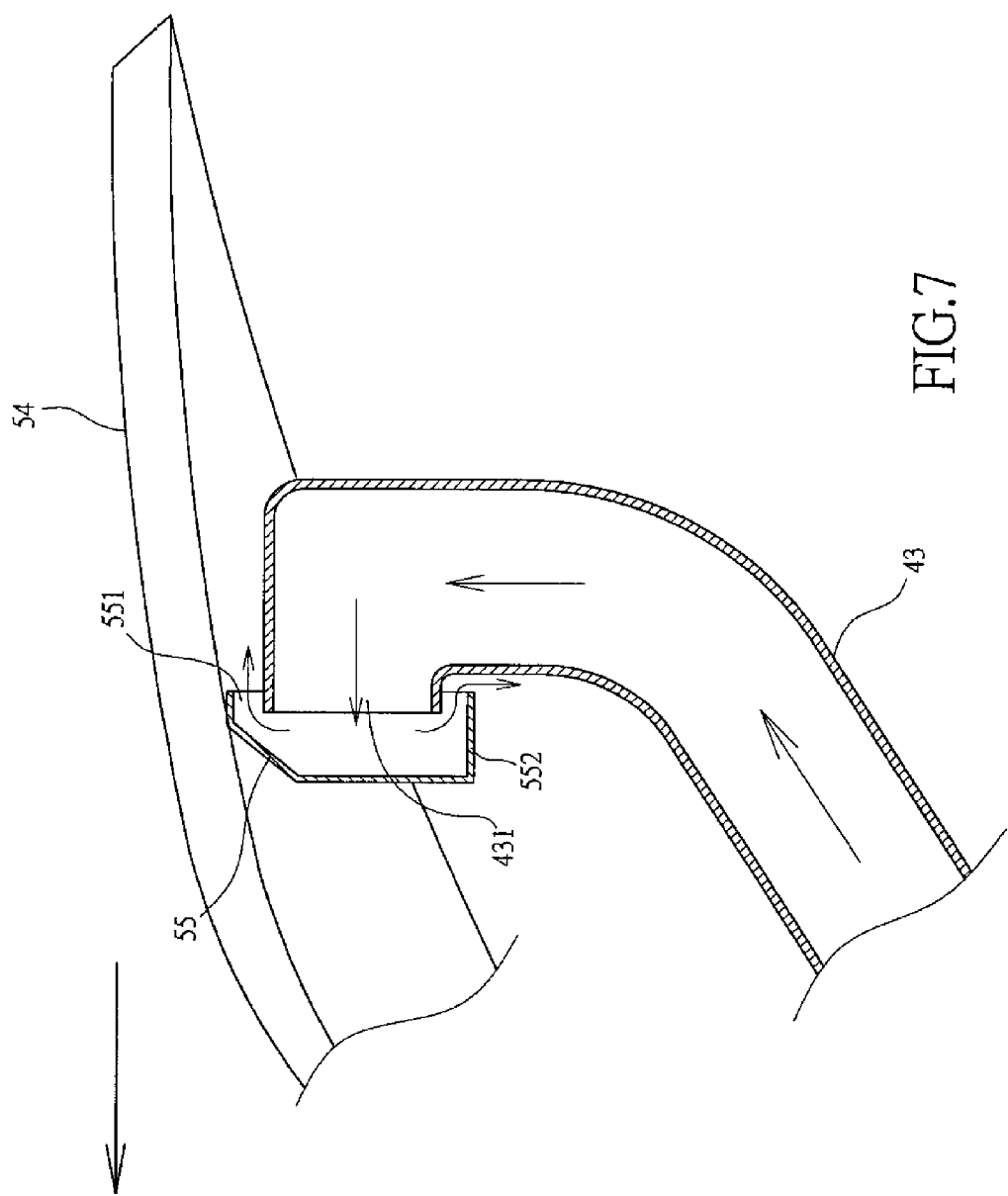
FIG. 7 is a sectional view of an exhaust conduit according to the present invention.
Figure 8:
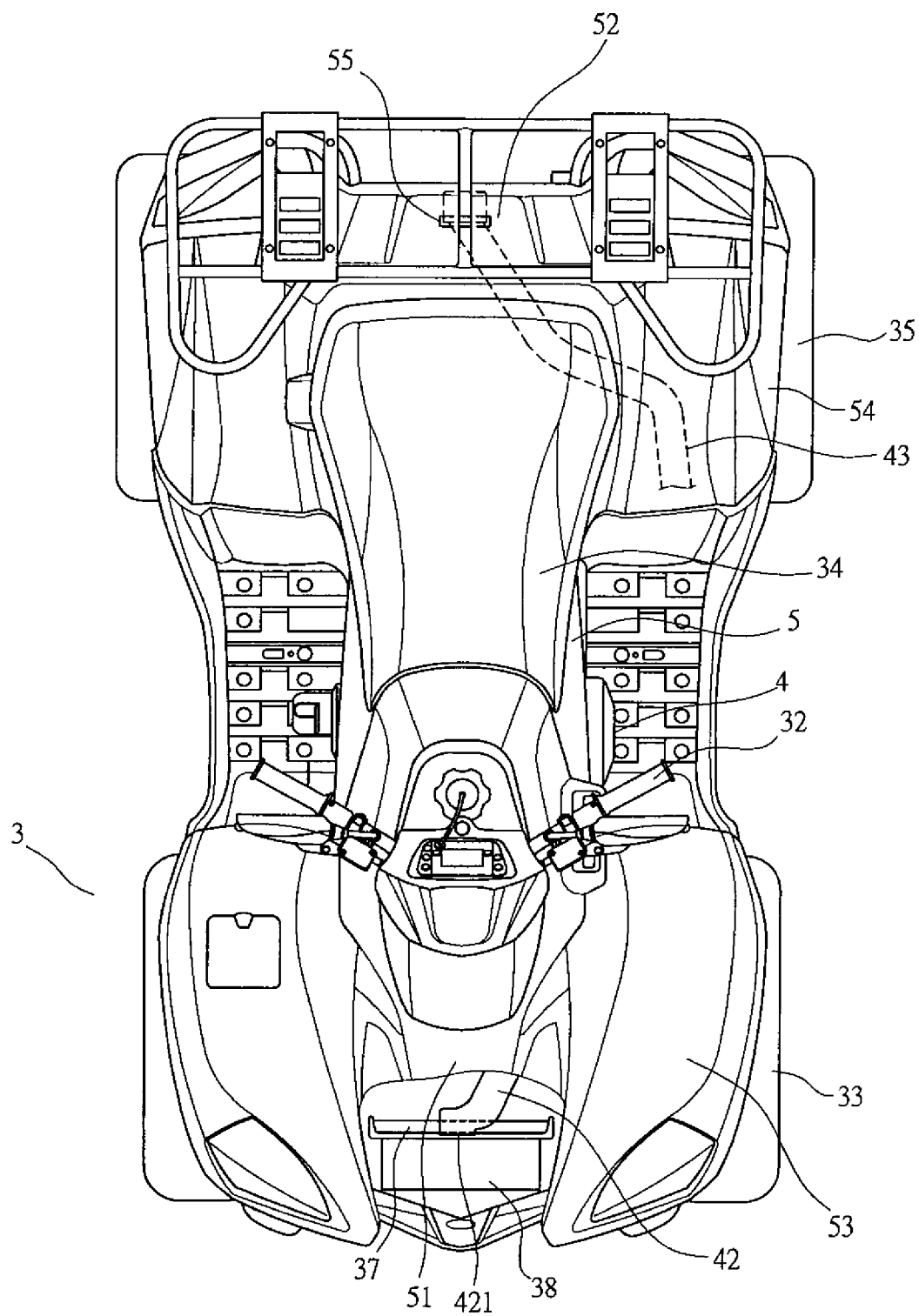
FIG. 8 is a top plan view of an all terrain vehicle according to the present invention.

As can be seen from FIGS. 5, 7 and 8, the exhaust conduit 43 includes a cap 55 installed down below the rear body cover 52, wherein the cap 55 can be integrally formed with the rear body cover 52. The cap 55 is a box-shaped member which is open at one side and closed at the other sides. The cap 55 is arranged close to the center line of the vehicle body and the opened-ended side 551 of the cap 55 is mounted to face the rear of the vehicle. The outlet end 431 of the exhaust conduit 43 is inserted into the cap 55. As illustrated in FIG. 7, there are appropriate spaces among the outlet end 431 of the exhaust conduit 43, the bottom side 552 of the cap 55, and the lateral sides 553 of the cap 55, so that when the cap 55 and the exhaust conduit 45 are connected together, the lateral side 553 of the cap 55 and the outlet end 431 of the exhaust conduit 43 overlap in projection thereby allowing a smooth discharge of the hot air through the exhaust conduit 43. Furthermore, the outlet end 431 of the exhaust conduit 43 is made facing the head of the vehicle, which further enhances the prevention of water, dirt and dust from entering the exhaust conduit 43.

The most important improvement of the present invention resides in the arrangement of the inlet end 421 of the inlet conduit 42 in between the hood 38 of the radiator 37 and the front car cover 51. This enhances the prevention of water, dirt and dust from entering the gearbox 41 and reduces the additional necessary components for preventing water, dirt and dust from entering the inlet conduit 42. The present invention effectively simplifies the structural components necessary for preventing water, dirt and dust from entering the gearbox 42, and facilitates the assembly and maintenance of the cooling structure.

Secondly, the present invention is characterized in the cap 55 which extends downwardly from the rear body cover 52 to receive the outlet end 431 of the exhaust conduit 43 of the gearbox 41 thereby preventing water, dirt, and dust from entering the gearbox 41. This reduces the additional necessary components for preventing water, dirt, and dust from entering the exhaust conduit 43, and effectively simplifies the structural components necessary for preventing water, dirt, and dust from entering the exhaust conduit 43.

Further, while the flexibility design of the cap 55 permits it to be equipped closer to the central line of the vehicle body, having the open-ended side 551 of the cap 55 faces rear also allows the outlet end 431 of the exhaust conduit 43 facing front. As all terrain vehicles possess the characteristic that the closer it is to the central line of the vehicle body, the lesser it is for the dirt and dust, having the outlet end 431 of the exhaust conduit 43 facing the same direction as the vehicle's moving direction improves the prevention of water, dirt, and dust from entering the exhaust conduit.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

We claim:

1. A cooling structure for a continuous variation transmission system of an all-terrain vehicle comprising:
   a continuous transmission system; and
   a gearbox enclosing said continuous transmission system and having a front end provided with an inlet and a rear end provided with an outlet, said inlet being connected with an inlet conduit for drawing outside cool air into said gearbox, said outlet being connected with an exhaust conduit for discharging hot air from said gearbox;
   wherein a cap is provided on a bottom side of a rear body cover and receives an outlet end of said exhaust conduit for preventing water, dirt and dust from entering said exhaust conduit, said cap is integrally formed with said rear body cover.

2. The cooling structure for a continuous variation transmission system of an all-terrain vehicle as claimed in claim 1, wherein said cap has an opened end facing a rear portion of said vehicle.

3. The cooling structure for a continuous variation transmission system of an all-terrain vehicle as claimed in claim 1, wherein an outlet end of said exhaust conduit is mounted facing a head portion of said vehicle.

4. The cooling structure for a continuous variation transmission system of an all-terrain vehicle as claimed in claim 1, wherein a lateral side of said cap and an outlet end of said exhaust conduit overlap in projection.

5. The cooling structure for a continuous variation transmission system of an all-terrain vehicle as claimed in claim 1, wherein said cap is mounted along a longitudinal center line of said vehicle.

\* \* \* \* \*